US006580752B1

(12) United States Patent
Amrany et al.

(10) Patent No.: US 6,580,752 B1
(45) Date of Patent: Jun. 17, 2003

(54) ALTERNATIVE CONFIGURATIONS FOR AN ADSL SYSTEM OPERATING IN A TIME DUPLEX NOISE ENVIRONMENT

(75) Inventors: Daniel Amrany, Ocean Township, NJ (US); Jean-Francois Lopez, Eatontown, NJ (US); Laurent Alloin, Long Branch, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 0 days.

(21) Appl. No.: 09/457,017

(22) Filed: Dec. 8, 1999

Related U.S. Application Data

(60) Provisional application No. 60/111,512, filed on Dec. 8, 1998.

(51) Int. Cl.[7] .............................. H04B 17/00; H04J 4/00

(52) U.S. Cl. ........................................ 375/225; 370/478

(58) Field of Search ................................. 375/225, 220, 375/222, 219, 377, 354, 254; 370/478, 286, 276, 517, 521

(56) References Cited

U.S. PATENT DOCUMENTS 5,673,290 A * 9/1997 Cioffi ........................... 375/260
5,757,803 A * 5/1998 Russell et al. .............. 370/494
5,838,667 A * 11/1998 Bingham et al. ........... 370/294
6,266,347 B1 * 7/2001 Amrany et al. ............. 370/478
6,377,640 B2 * 4/2002 Trans .......................... 375/354
6,449,316 B1 * 9/2002 Matsumoto et al. ........ 375/285

* cited by examiner

*Primary Examiner*—Khai Tran
(74) *Attorney, Agent, or Firm*—Thomas, Kayden, Horstemeyer & Risley

(57) ABSTRACT

An ADSL system for operating in a time duplex system that provides alternative configurations for limiting crosstalk in a broadband network is disclosed. The ADSL system introduces a trial bitmap profile configuration to maximize the bit rate at which information is transmitted, regardless of network topology. In a simplified embodiment, a composite signal to noise ratio is derived from a minimum far end crosstalk signal to noise ratio and a minimum near end crosstalk signal to noise ratio. A maximum bit rate for the transfer of information, which is directly related to the derived composite SNR, is then determined. Information is then transmitted simultaneously between an asymmetric digital subscriber line central office and an asymmetric digital subscriber line customer premise at the determined maximum bit rate. In an alternative embodiment, a selection is made between a single, dual, or trial bitmap profile configuration as a function of noise environment and channel loop length, thereby ensuring maximum bit rate throughput of an ADSL system operating in the presence of TCM-ISDN interference.

21 Claims, 8 Drawing Sheets

ISDN-CO
66
ISDN-RT
68
64
CO NEXT
RT NEXT
ADSL-CO
60
ADSL-CP
62
CO FEXT
RT FEXT

ALTERNATIVE CONFIGURATIONS FOR AN ADSL SYSTEM OPERATING IN A TIME DUPLEX NOISE ENVIRONMENT

CROSS REFERENCE TO RELATED APPLICATIONS

This application claims the benefit of U.S. Provisional Application Serial No. 60/111,512 filed on Dec. 8, 1998 and entitled "Alternative Configurations for a DMT ADSL System Operating in a Time Duplex Noise Environment, Such as TCM-ISDN Interferers," which is incorporated by reference herein in its entirety.

FIELD OF THE INVENTION

The present invention relates generally to broadband networks, and more particularly to a system for efficiently minimizing the effects of a time-duplex noise environment causing alternate near end crosstalk and far end crosstalk noise in an ADSL system.

BACKGROUND OF THE INVENTION

Asymmetric digital subscriber line (ADSL) technology has been introduced into the field of broadband networking, among other reasons, to overcome issues faced by traditional voice band technology. Such issues include, but are not limited to, bandwidth limitations. ADSL technology utilizes the infrastructure already in place in a public switched telephone network (PSTN), including copper loops, constructed of copper wires, between a customer premise and a central office. Advantageously, ADSL technology does not require replacement of network equipment such as routers, switches, firewalls and web servers, which are commonly used in today's paradigm for broadband access.

Unfortunately, in a telephone network, while electrical energy is transmitted across copper wires, a modulated signal also radiates energy onto adjacent copper wire loops that are located in the same cable bundle. This cross coupling of electromagnetic energy is referred to as crosstalk.

In a typical telephone network, multiple insulated copper wire pairs are bundled together into a cable called a cable binder. Adjacent systems within a cable binder that transmit or receive information in the same range of frequencies can create significant crosstalk interference. The crosstalk interference is attributed to crosstalk-induced signals combining with signals that were originally intended for transmission over the copper wire loop. The result is a slightly different shaped waveform than was originally transmitted, which is representative of data degradation.

Crosstalk can be categorized in one of two forms. Near end crosstalk, commonly referred to as NEXT, is the most significant because a high energy signal from an adjacent system can induce relatively significant crosstalk into the primary signal. In other words, NEXT essentially is a measure of the crosstalk noise that two devices used for communication purposes induce upon each other at the same end of the cable binder.

Another form of crosstalk is far end crosstalk, or FEXT. FEXT is typically measured by applying a test signal to a wire pair at one end of a channel and measuring the disturbance on other wire pairs at the far end. Therefore, FEXT essentially measures the crosstalk noise that communications equipment creates for devices it is communicating with at the opposite end of the wire pair used for data transmission. Typically, FEXT is less of an issue than NEXT since the far end interfering signal is attenuated as it traverses the copper wire loop.

In an environment, where Time Compressed Multiplex Integrated Service Digital Network (or TCM-ISDN) is deployed, the source of NEXT and FEXT noises are commonly referred to as TCM-ISDN interferers. The TCM-ISDN system performs alternatively upstream and downstream transmission of data during a period referred to as the TCM timing reference (TTR). In the first half of the TTR, an ISDN central office (ISDN-CO) transmits data to an ISDN remote terminal (ISDN-RT), while during the second half of the TTR period the ISDN-RT transmits data to the ISDN-CO. Consequently, an ADSL transceiver, connected to the wire loop via the CO end, receives NEXT noise from the ISDN-CO during the first half of the TTR, and FEXT noise from the ISDN-RT during the second half of the TTR. Conversely, an ADSL transceiver unit, connected to the wire loop via the ISDN-RT end, receives FEXT noise from the ISDN-CO during the first half of the TTR period, and NEXT noise from the ISDN-RT during the second half of the TTR period.

The effect of crosstalk is more dominant on the ISDN-CO's side of copper wire loops than on the ISDN-RT side. This phenomena is due to the fact that more copper wires, each of which introduces a crosstalk component, are combined in large bundles as they get closer to entering the ISDN-CO. Conversely, as the loop from the ISDN-CO to the ISDN-RT user is traversed, the loop tends to branch off for connection to numerous ISDN-RTs, resulting in fewer copper wire loops located in a bundle. Therefore, less aggregated NEXT crosstalk is introduced by the ISDN-RT transmitters at the far end wire bundles.

The presence of ISDN-NEXT and FEXT noises affects the performance of an ADSL system differently. During the initialization of a typical ADSL transmission link, an ADSL system estimates the noise level that affects the transmission link. Since NEXT noise is generally very powerful, its presence during bit-loading computation of the ADSL transmission link causes a very poor data rate throughput, which is particularly noticeable on long loop lengths. Further, the noise level measured for bit-loading computation is required to be constant such that a bit loading profile, which ensures a certain bit error rate (BER) with a given noise margin, can be derived and applied for accurate transmission of data.

Unfortunately, as previously demonstrated, in the TCM-ISDN case, noise level is time varying across the TTR period. If noise estimation is implemented with the assumption of a constant stationary noise, the estimation procedure only provides a single average noise level for both FEXT and NEXT noises. Eventually, the noise level computed in this manner is over-estimated when the channel is affected by FEXT noise and underestimated when the channel is affected by NEXT noise. As a result, the transmission of data with a bit loading profile derived from the average noise level, more than meets the requirements during the FEXT period, while it is not possible to ensure transmission of data at the required BER with the desired noise margin during the NEXT period.

SUMMARY OF THE INVENTION

In light of the foregoing, the invention generally relates to an ADSL system for operating in a time duplex system that provides alternative configurations for limiting crosstalk in a broadband network by maximizing the bit rate at which information is transmitted, regardless of network topology. The preferred embodiment derives a composite signal to noise ratio from a minimum far end crosstalk signal to noise ratio and a minimum near end crosstalk signal to noise ratio. A maximum bit rate for the transfer of information, which is directly related to the derived composite SNR, is then determined. The information is then transmitted simultaneously between an ADSL-CO and an ADSL-CP at the determined maximum bit rate.

In accordance with an alternative embodiment of the invention, a selection is made between a single, dual, or trial bitmap profile configuration as a function of noise environment and channel loop length, thereby ensuring maximum bit rate throughput of an ADSL system operating in the presence of TCM-ISDN interference.

The invention has numerous advantages, a few of which are delineated hereafter as examples. Note that the embodiments of the invention, which are described herein, possess one or more, but not necessarily all, of the advantages set out hereafter.

One advantage of the invention is that it allows the maximization of the bit rate throughput of an ADSL system operating in the presence of TCM-ISDN interference.

Another advantage is that it allows continuous transmission of data with an ensured transmission performance in any type of network topology, whatever the level of FEXT and NEXT noises can be relative to each other.

Other features and advantages of the present invention will become apparent to one of reasonable skill in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiments of the invention, which, however, should not be taken to limit the invention to the specific embodiments, but are for explanation and for better understanding. Furthermore, the drawings are not necessarily to scale, emphasis instead being placed upon clearly illustrating the principles of the invention. Finally, like reference numerals in the figures designate corresponding parts throughout the several drawings.

DESCRIPTION OF THE PREFERRED EMBODIMENTS

Figure 1:
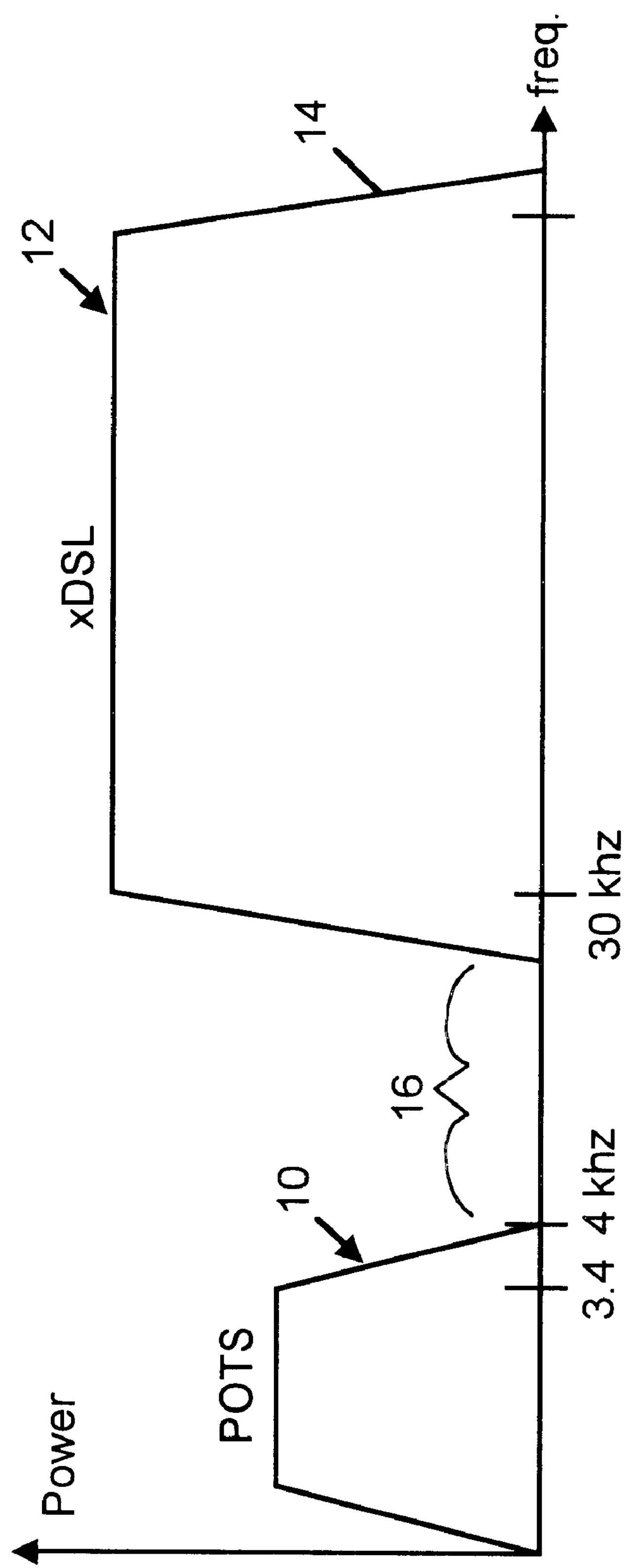
FIG. 1 is a graph illustrating the spectrum allocation for both POTS and xDSL signals.

Referring now to the drawings, wherein like reference numerals designate corresponding parts throughout the drawings, FIG. 1 shows the spectrum allocation for both POTS and xDSL signals. Specifically, the graph plots frequency on the horizontal axis and power on the vertical axis. As is known, the POTS frequency band 10 generally extends from approximately DC, or 0 hertz, to approximately 3.4 kilohertz. The xDSL frequency band 12 generally extends from approximately 30 kilohertz up to an upper boundary 14, which varies depending upon the particular digital subscriber line technology utilized. A separation or guard band 16 provides a margin of signal separation between the POTS frequency band and the xDSL frequency band, thereby allowing both POTS and xDSL to co-exist on the same wire.

Figure 2:
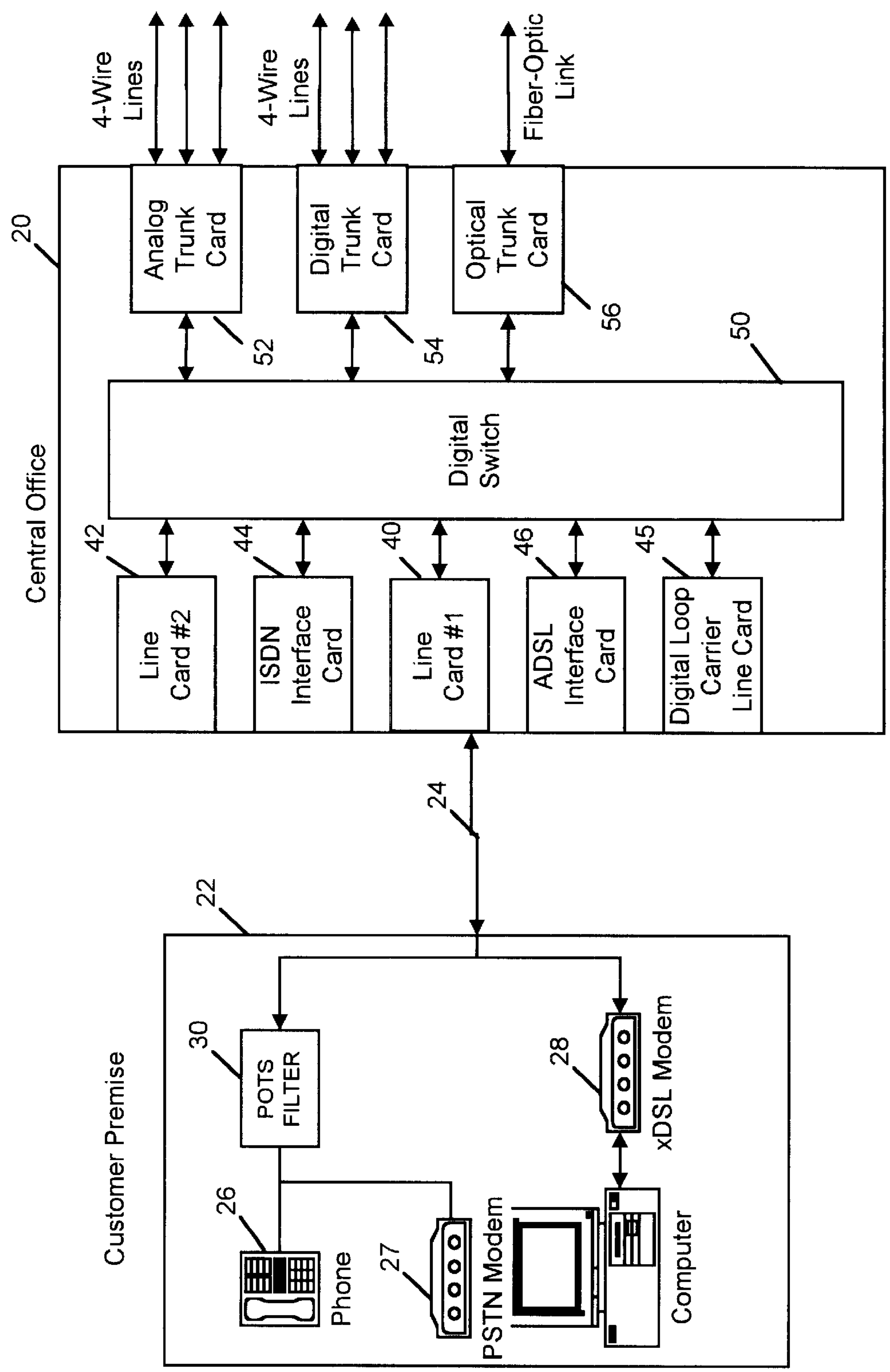
FIG. 2 is a block diagram of a prior art communications system between a central office and a customer premise.

Referring now to FIG. 2, a prior art communication system is shown. Specifically, FIG. 2 illustrates communication between a central office 20 and a customer premise 22 by way of a local loop 24. While the customer premise 22 may be a single dwelling residence, a small business, or other entity, it is generally characterized as having POTS equipment, such as a telephone 26, PSTN modem 27, fax machine (not shown), etc. The customer premise 22 may also include an xDSL communication device, such as an xDSL modem 28. When an xDSL service is provided, such as, but not limited to, ADSL, a POTS filter 30 is interposed between the POTS equipment 26 and the local loop 24. As is known, the POTS filter 30 includes a low-pass filter having a cut-off frequency of approximately 4 kilohertz to 10 kilohertz, in order to filter high frequency transmissions from the xDSL communication device 28 and protect the POTS equipment.

At the central office 20, additional circuitry is provided. Generally, a line card 40 containing line interface circuitry is provided for electrical connection to the local loop 24. In fact, multiple line cards may be provided 40, 42 to serve as a plurality of local loops. In the same way, additional circuit cards are typically provided at the central office 20 to handle different types of services. For example, an integrated services digital network (ISDN) interface card 44, a digital loop carrier line card 45, and other circuit cards, for supporting similar and other communication services, may be provided. Particular to the present ADSL system, an ADSL interface card 46 may also be provided at the central office 20 in order to handle ADSL services, as further demonstrated by FIG. 3.

A digital switch 50 is also provided at the central office 20 and is disposed for communication with each of the various line cards 40, 42, 44, 45, 46. On the outgoing side of the central office 20 (i.e., the side opposite the various local loops), a plurality of trunk cards 52, 54, 56 are typically provided. For example, an analog trunk card 52, a digital trunk card 54, and an optical trunk card 56 are all illustrated in FIG. 2. Typically, these cards have outgoing lines that support numerous multiplexed transmissions and are typically destined for other central offices or long distance toll offices.

Figure 3:
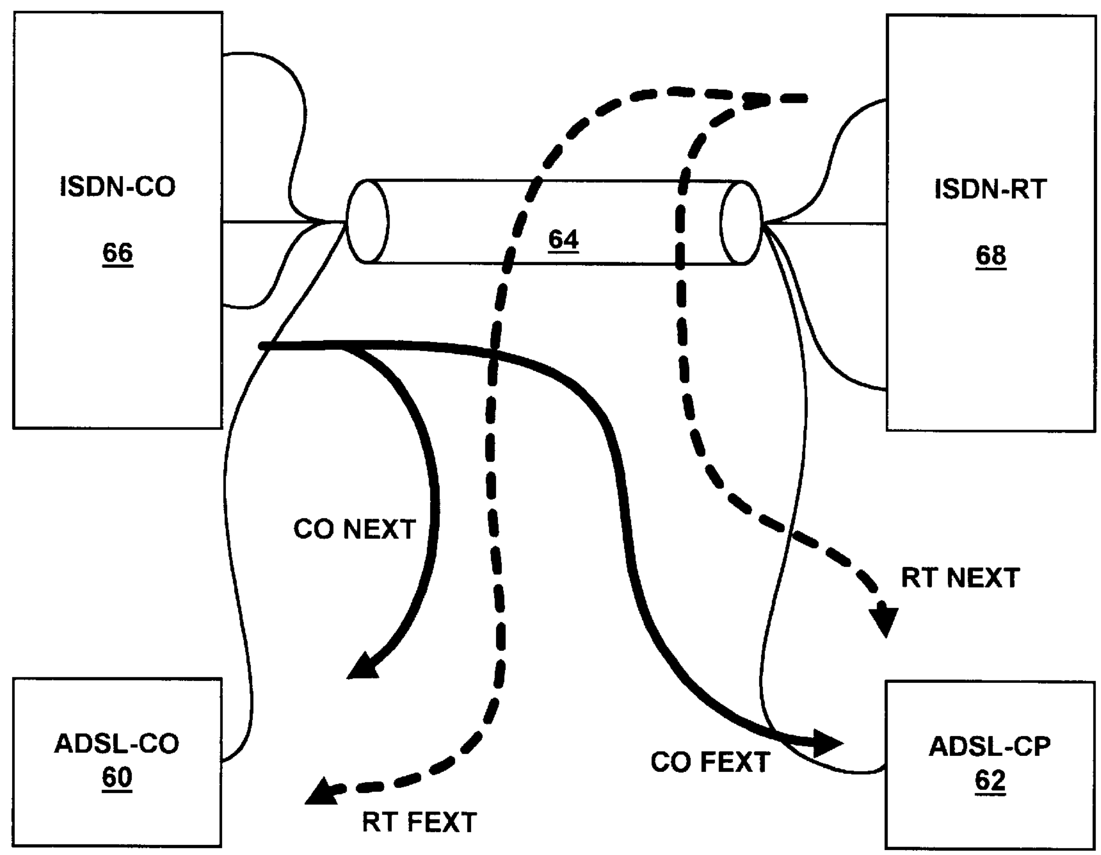
FIG. 3 is a block diagram illustrating the effects of crosstalk wherein a first ADSL transceiver is connected to a second ADSL transceiver via a cable bundle shared with existing TCM-ISDN links between an ISDN-CO and an ISDN-RT.

FIG. 3 illustrates the effects of crosstalk wherein a first ADSL transceiver (ADSL-CO) 60 is connected to a second ADSL transceiver (ADSL-CP) 62 via a cable bundle 64 that is shared with existing TCM-ISDN links between an ISDN- CO 66 and an ISDN-RT 68. It should be noted that while the present disclosure is made with reference to the ISDN standard, other standards may be supplemented which operate in a time duplex environment. Further, while the below-mentioned description of FIG. 3 describes an ADSL downstream transmission of data between an ADSL-CO 60 and an ADSL-CP 62, one skilled in the art would understand that an ADSL upstream transmission of data between an ADSL-CP 62 and an ADSL-CO 60 is simply represented by switching the NEXT and FEXT periods.

During the first half of a TTR period, as designated by the bold solid line, when information is transmitted from the ISDN-CO 66 to the ISDN-RT 68, the ADSL-CO 60 receives NEXT noise from the ISDN-CO 66, and the ADSL-CP 62 receives FEXT noise from the ISDN-CO 66. Accordingly, when considering ADSL downstream transmission between an ADSL-CO 60 and an ADSL-CP 62, the first half of the TTR period is also referred to as the FEXT period, since this is the period in which the ADSL-CP 62 receives FEXT noise. As known to one skilled in the art, characteristic of ADSL technology is the fact that the ADSL-CO 60 and ADSL-CP 62 communicate simultaneously. As such, in accordance with the preferred embodiment of the invention, a downstream path is defined as transmission of data from the ADSL-CO 60 to the ADSL-CP 62, and an upstream path is defined as transmission of data from the ADSL-CP 62 to the ADSL-CO 60.

During the second half of the TTR period, as designated by the bold dotted line, when information is transmitted from the ISDN-RT 68 to the ISDN-CO 66, the ADSL-CP 62 receives NEXT noise from the ISDN-RT 68, and the ADSL-CO 60 receives FEXT noise from the ISDN-RT 68. Accordingly, when considering the ADSL downstream transmission of data between an ADSL-CO 60 and an ADSL-CP 62, the second half of the TTR period is also referred to as the NEXT period, since this is the period in which the ADSL CP 62 receives NEXT noise.

When considering the ADSL upstream transmission of data between an ADSL-CP 62 and an ADSL-CO 60, the NEXT and FEXT periods are switched. This switch is due to the ADSL-CO 60 receiving NEXT noise from the ISDN-CO 66 during the first half of the TTR period, while receiving FEXT noise from the ISDN-RT 68 during the second half of the TTR period.

In accordance with the preferred embodiment of the invention, the ADSL receiver (ADSL-CP 62 for downstream transmission/ADSL-CO 60 for upstream transmission) will be said to operate in a FEXT mode, while it experiences FEXT noise and in a NEXT mode, while it experiences NEXT noise.

It should be noted that, while the foregoing is provided generally with reference to ADSL technology, one skilled in the art will appreciate that other DSL technologies requiring the mitigation of time duplexed crosstalk effects may also be provided for by the present technique.

As mentioned hereinabove, presently both FEXT and NEXT noises are experienced during the transmission of data, wherein an ADSL system is used. As a solution capable of minimizing both FEXT and NEXT noise, the present ADSL system introduces three bitmap profile configurations, wherein each configuration provides advantages to data transmission as a function of both loop length and bit rate. The configurations include single, dual and trial bitmap profile configurations, as described in detail hereinbelow.

Figure 4:
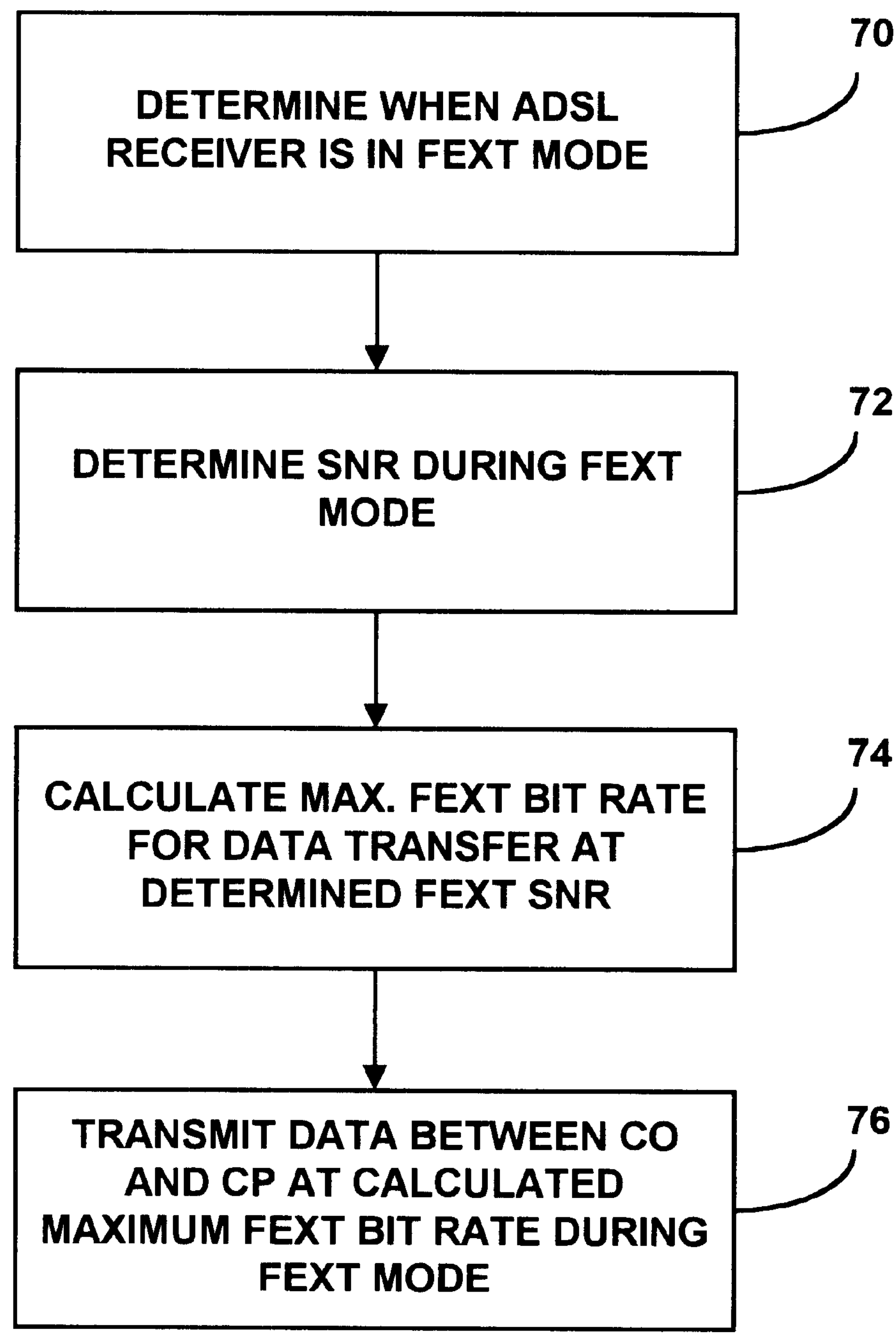
FIG. 4 is a flow chart illustrating logic performed in the presently existing single bitmap profile configuration.

FIG. 4 is a flow chart illustrating steps performed in the presently existing single bitmap profile configuration. The single bitmap profile configuration is used to transmit data only when an ADSL receiver is in a FEXT mode as previously defined. As such, the single bit profile configuration is also referred to as a FEXT bitmap.

As shown by block 70, a determination is first made as to when the ADSL receiver is in FEXT mode. Block 72 shows that the signal to noise ratio (SNR) for data transmission is then determined during the FEXT mode, as suggested for example in the ITU G.992.1 and G.992.2 standards according to the principle of the sliding window. Since one of ordinary skill in the art would be familiar with the ITU G.992.1 and ITU G.992.2 standards, further explanation of this SNR determination standard is not offered. However, it should be appreciated that any alternative method of yielding an equivalent SNR measurement during the FEXT period is adequate. As an example, The SNR for data transmission during FEXT mode may also be measured by applying a test signal to a wire at the CO end of the link between the CO and the RT and measuring the disturbance on a different wire located near the RT.

As illustrated by block 74, once the SNR during FEXT mode has been determined, the maximum bit rate for the transfer of data at the determined SNR is calculated. Block 76 shows that data is then transmitted from the ADSL-CO 60 to the ADSL-CP 62, as well as from the ADSL-CP 62 to the ADSL-CO 60, at the calculated maximum bit rate, during the FEXT mode.

The aforementioned single bitmap profile configuration provides improved data transmission performance on long loops, where NEXT noise is predominant. As an example, long loops may be, but are not limited to, lengths greater than approximately 6 kft between the ADSL-CO 60 and the ADSL-CP 62. Unfortunately, on short loops, the single bitmap profile configuration does not use the bandwidth available during the NEXT period, and, as such, is not efficient in short loops.

Figure 5:
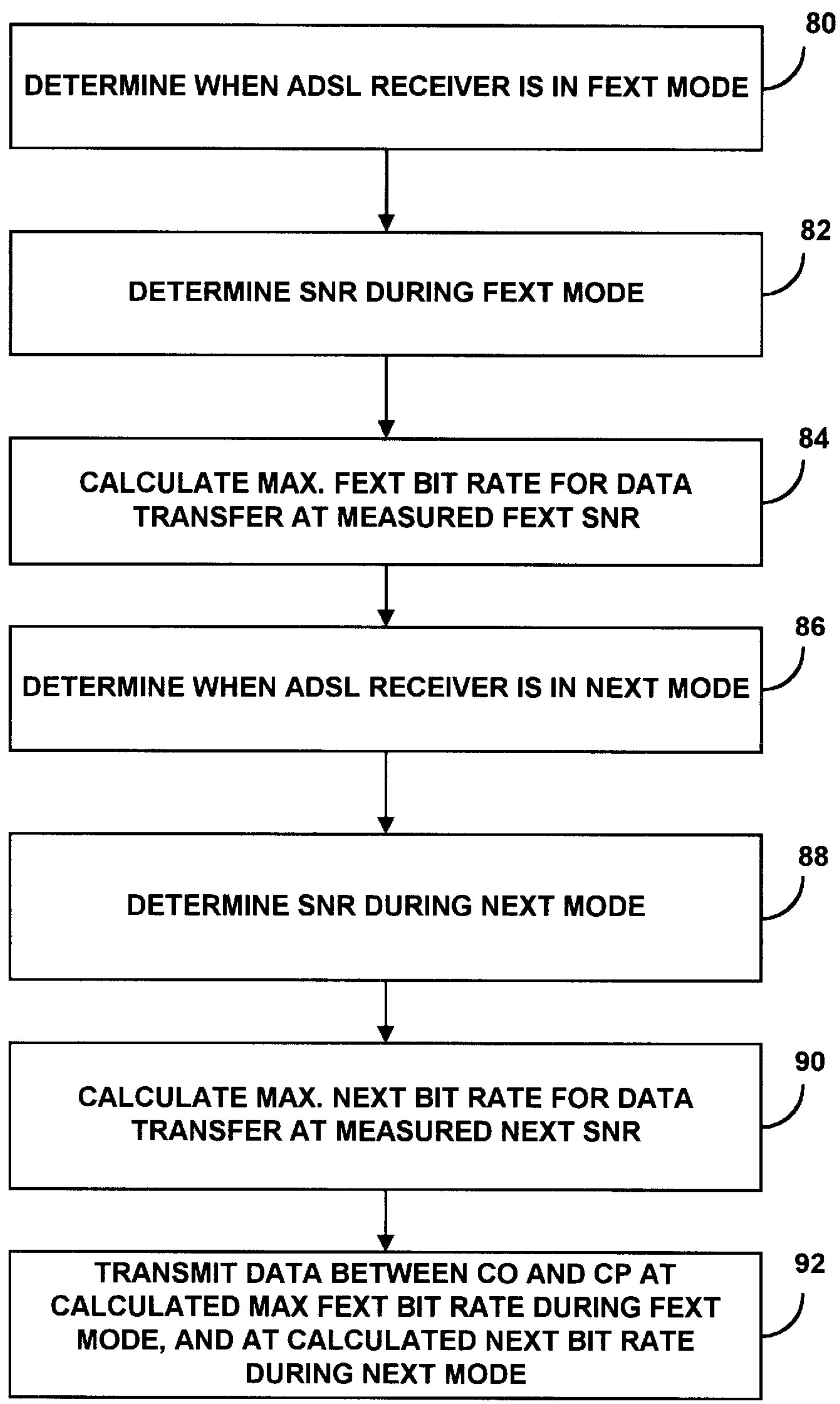
FIG. 5 is a flow chart illustrating logic performed in the presently existing dual bitmap profile configuration.

Referring now to the flow chart of FIG. 5, steps performed in the presently existing dual bitmap profile configuration are illustrated. As shown by block 80, a determination is first made as to when the ADSL receiver is in FEXT mode. Block 82 shows that the SNR for data transmission is then determined during the FEXT mode, in the same manner as that performed in the single bitmap profile configuration (FIG. 4). As such, methods of determining SNR are not repeated here.

As shown by block 84, once the SNR during FEXT mode has been determined, the maximum bit rate for the transfer of data during FEXT mode is determined, which is directly related to the measured SNR during FEXT mode, such that data transmitted at the calculated bit rate will be minimally effected by FEXT noise.

Block 86 shows that a determination is then made as to when the ADSL receiver is in NEXT mode, i.e. under the influence of NEXT noise from the ISDN system. As shown by block 88, the signal to noise ratio (SNR) for data transmission is then determined during the NEXT mode, as suggested in the ITU G.992.1 and ITU G.992.2 standards according to the principle of the sliding window. Since one of ordinary skill in the art would be familiar with the ITU G.992.1 and ITU G.992.2 standards, further explanation is not offered. The SNR for data transmission during NEXT mode may also be measured by applying a test signal to a first wire at the CO end of the link between the CO and the RT and measuring the disturbance on a different wire located near the first wire having the test signal applied thereto.

As illustrated by block 90, once the SNR has been determined during the NEXT mode, the maximum bit rate for the transfer of data is determined, which is directly related to the measured SNR during the NEXT mode such that data transmitted at the calculated bit rate will be minimally effected by NEXT noise. Typically, the maximum NEXT bit rate will be smaller than the maximum FEXT bit rate due to the intensity of NEXT noise.

As shown by block 92, data is then received and transmitted between the ADSL-CO 60 and the ADSL-CP 62 at the calculated bit rate during the FEXT mode, at the maximum FEXT bit rate, and during the NEXT mode, at the maximum NEXT bit rate. This solution improves data transmission performance on both long loops and short loops with respect to the single bitmap profile configuration described hereinabove.

Unfortunately, the dual bitmap profile configuration can only be applied in certain topologies where NEXT noise is higher than FEXT noise. This is attributed to a characteristic of the dual bitmap profile configuration being that symbols are transmitted during FEXT mode at a higher bit rate than during NEXT mode. In this case, symbols that are partially affected by NEXT noise are always transmitted at the lower bit rate (NEXT mode), as suggested in the aforementioned standards. However, if FEXT noise were higher than NEXT noise, transmission of these symbols would take place at a higher bit rate. This would result in the corruption of the integrity of transmitted information.

Further, as know in the art, the single bitmap and dual bitmap profile configurations also require the implementation of additional functional blocks, such as a rate converter, to provide for irregular data flow transmitted on the line in the FEXT and NEXT periods. Moreover, the dual bitmap profile configuration is resource consuming, since a second set of profile parameters needs to be stored. Specifically addressing the dual bitmap configuration, swapping from one set of parameters to another needs to be performed in FEXT and NEXT periods, thereby requiring further complexity.

Figure 6:
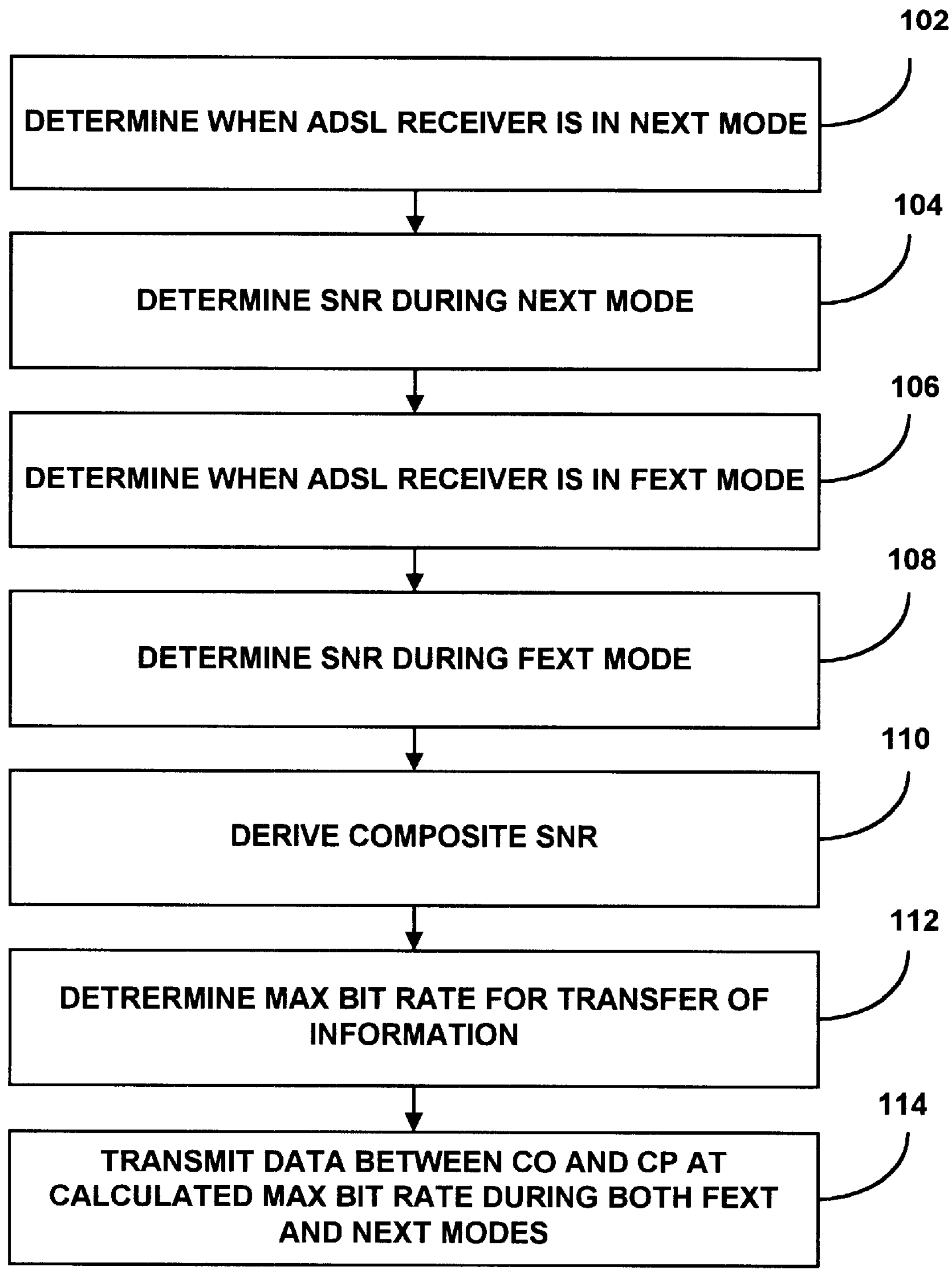
FIG. 6 is a flow chart illustrating logic performed in the trial bitmap profile configuration, in accordance with the preferred embodiment of the invention.

To address the aforementioned disadvantages of the single and dual bitmap profile configurations, a trial bitmap profile configuration is introduced in accordance with the preferred embodiment of the invention. Referring now to the flow chart of FIG. 6. logical steps performed in the trial bitmap profile are illustrated, which may be used to limit the effects of crosstalk during the transmission of data in any network topology. As shown by block 102, a determination is first made as to when an ADSL receiver is in NEXT mode. Block 104 shows that the SNR for data transmission is then determined during the NEXT mode.

Figure 7:
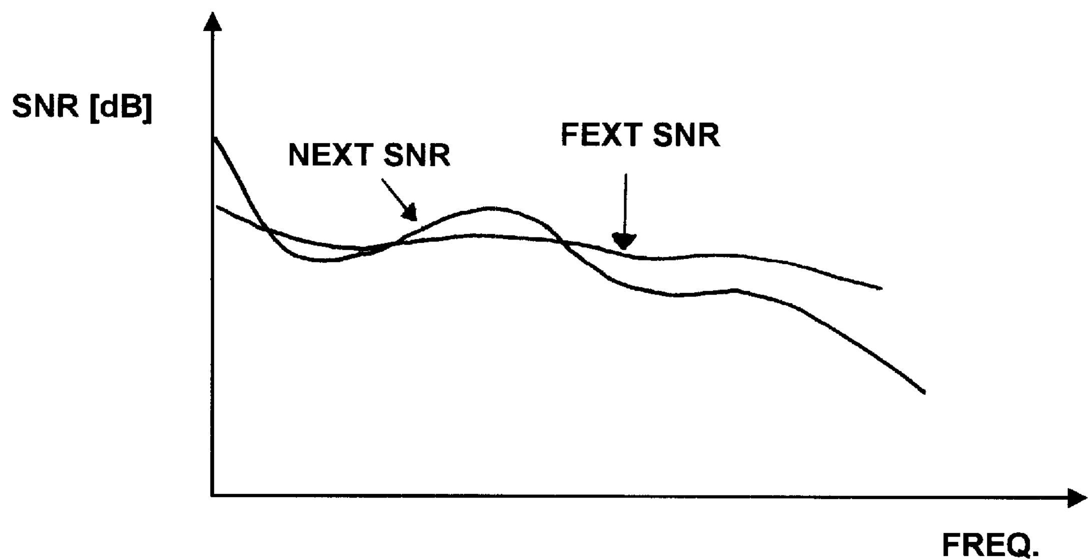
FIG. 7 is a graph illustrating SNR plotted during FEXT and NEXT modes, which is derived based upon the trial bitmap profile configuration of FIG. 6.

As shown by block 106, a determination is then made as to when the ADSL receiver is in FEXT mode. Block 108 shows that the SNR for data transmission is then determined during the FEXT mode. FIG. 7 is a graph illustrating an example of SNR plotted during FEXT and NEXT modes. Referring to FIG. 7, the Y axis of the chart represents SNR and the X axis represents frequency. As shown by the chart, usually NEXT noise will be higher than FEXT noise. As such, the SNR during NEXT mode, represented by the solid line, is typically lower than the SNR during FEXT mode, represented by the dotted line.

Figure 8:
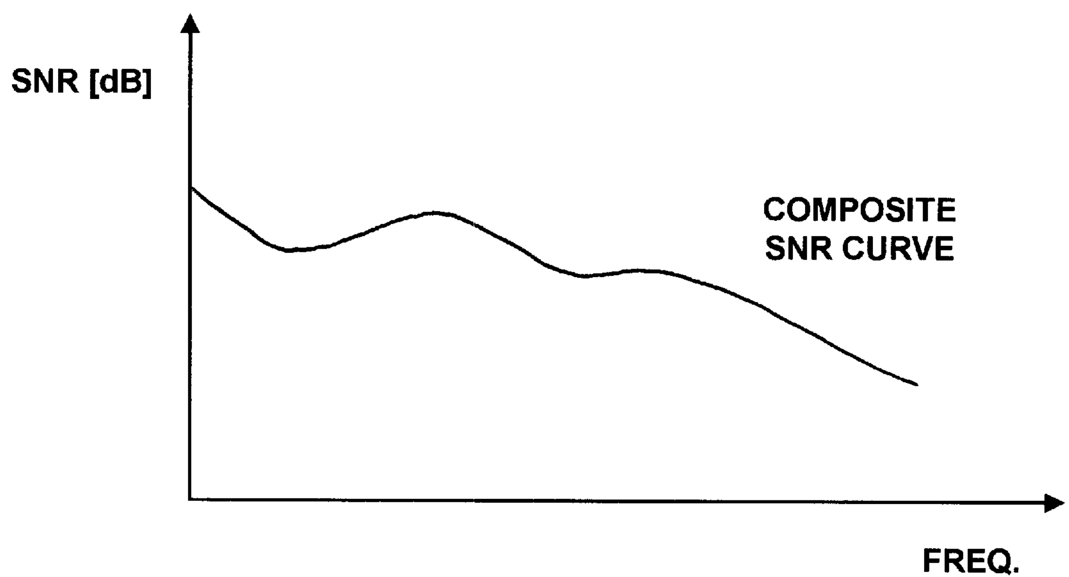
FIG. 8 is a graph illustrating a composite SNR plot based upon the plotted FEXT and NEXT modes of FIG. 7.

Referring back to FIG. 6, as shown by block 110, a composite SNR is then derived, which consists of the minimum of the two SNRs measured in FEXT and NEXT modes for each frequency. FIG. 8 is a graph illustrating an example of a composite SNR plot during the plotted FEXT and NEXT modes of FIG. 7. As in FIG. 7, the Y axis of the chart represents SNR and the X axis represents frequency. Typically, since NEXT noise exceeds FEXT noise in most network topologies, the composite SNR plot is equivalent to the SNR measurement derived during the NEXT mode. Therefore, the bit loading profile typically chosen for data transmission corresponds to the one derived assuming that NEXT noise is always present.

Referring back to FIG. 6, as shown by block 112, once the composite SNR during NEXT and FEXT modes has been determined, the maximum bit rate for the transfer of information is determined. The maximum bit rate is directly related to the calculated composite SNR such that data transmitted at the calculated bit rate at each individual frequency will be minimally affected by worst case NEXT or FEXT noise. As shown by block 114, data is then transmitted from the ADSL-CO 60 to the ADSL-CP 62 and from the ADSL-CP 62 to the ADSL-CO 60 simultaneously, at the calculated maximum bit rate, during both the FEXT and NEXT modes.

Figure 9:
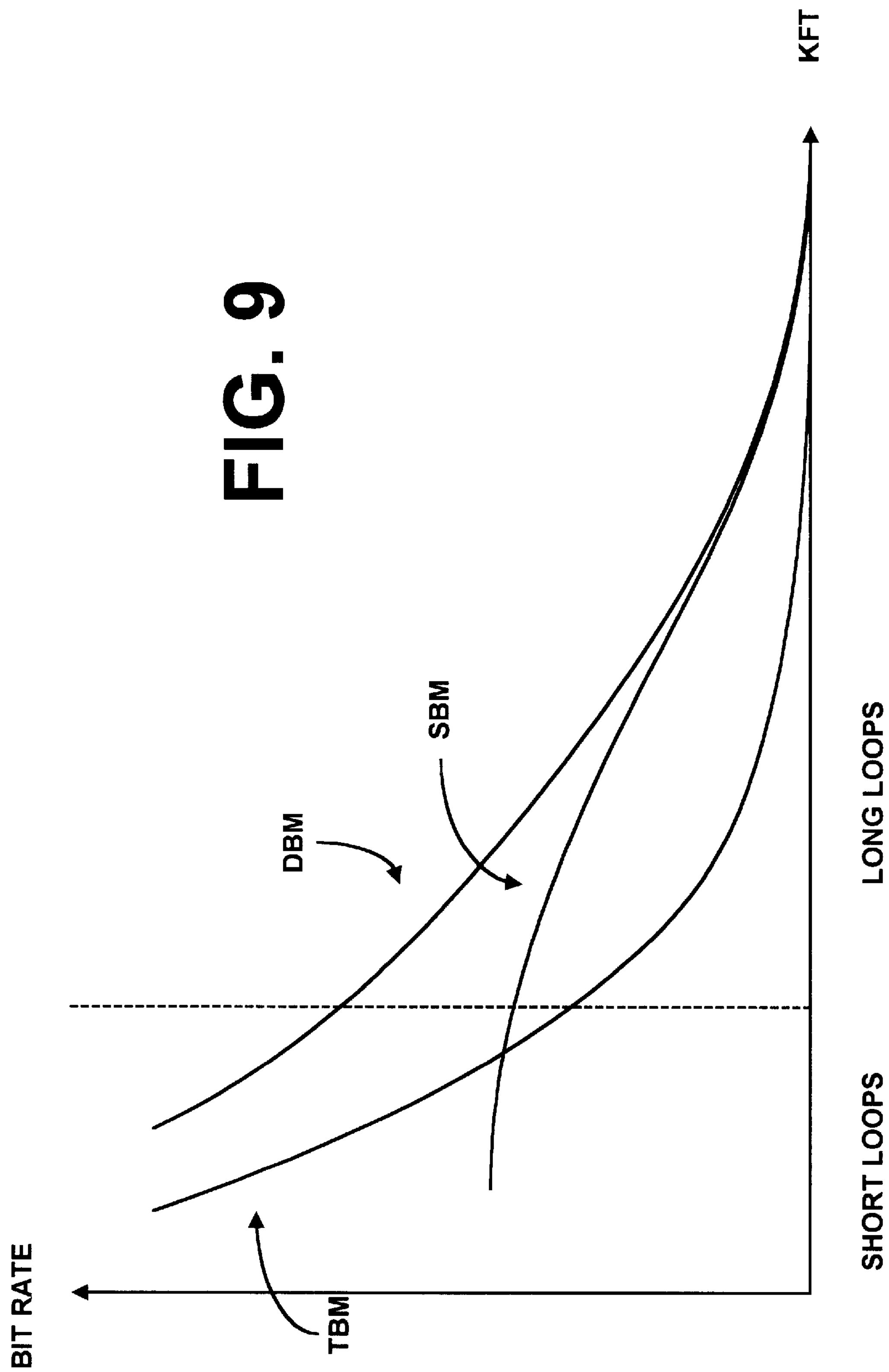
FIG. 9 is a graph illustrating the increase and decrease in the bit rates of the single, dual, and trial bitmap profile configurations, as a function of loop length.

The trial bitmap profile may improve data transmission performance on short loops better than the single bitmap profile configuration as is illustrated by FIG. 9. FIG. 9 is a graph illustrating the single- dual, and trial bitmap profiles, and their increase, and decrease, in bit rate as a function of loop length. Further, as previously mentioned hereinabove, on particular loop topologies where NEXT noise is less than FEXT noise, operation according to the dual bitmap profile configuration is excluded due to it being non-feasible. In such situations, the trial bitmap profile configuration represents an efficient and effective alternative to both the single bitmap profile configuration and the dual bitmap profile configuration.

In accordance with an alternative embodiment of the present invention, the present ADSL system is adaptable to the environment in which it operates. Since the constraints with which the ADSL system has to work differ from one situation to another, according to loop topology, the alternative embodiment of the present invention provides for the ADSL system to be multi-profile configurable. As such, the alternative embodiment provides increased flexibility in which the system may choose a working configuration between the single, dual and trial bitmap profile configurations, as a function of the environment.

In accordance with the alternative embodiment of the invention, a selection is made at the start-up of the ADSL system, between the single, dual and trial bitmap profile configurations, as a function of the maximum bit rate throughput achievable by any of the three profile configurations, as well as the relative level of FEXT and NEXT SNR measured in the particular environment. The retained configuration is then used for transmitting data.

Typically, for long distances, the single bitmap profile is used, which provides data transmission performances that are similar to the dual bitmap profile. Alternatively, for short distances, the dual bitmap profile configuration or trial bitmap profile configuration is used to transmit data. For network topologies where FEXT noise supercedes NEXT noise in certain frequency ranges, dual bitmap profile is precluded. Therefore, when FEXT noise supercedes NEXT noise, transmission of information is performed using the trial bitmap profile configuration. As mentioned hereinabove, transmission with the trial bitmap profile configuration is selected based upon the comparison of the SNR curves during FEXT and NEXT modes.

Since it is not necessary for the alternate embodiment of the invention to select the dual bitmap profile configuration for the transmission of information, and profile selection is performed at system initiation, the alternate embodiment operates with a requirement of fewer resources for nearly the same performance as a system using the dual bitmap profile. In fact, switching the bit rate of information transmission is no longer necessary when using the alternate embodiment, which avoids the need for storing characteristics of a second noise mode. Therefore, the alternate embodiment spares memory and reduces operational complexity.

Further, since it is not necessary for the alternate embodiment to use the dual bitmap profile configuration, the alternate embodiment of the invention is capable of effectively functioning whether NEXT noise supercedes FEXT noise or FEXT noise supercedes NEXT noise. It should be noted that selecting the system of the alternative embodiment of the invention is not attributed exclusively to increasing bit rate throughput, but may instead be attributed to such things as, but not limited to, ease of implementation and resource availability.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. A system for providing a maximum bit rate for the transfer of information, by limiting crosstalk, regardless of network topology, comprising:

a first transceiver for transmitting information; and a second transceiver for receiving said information from said first transceiver, wherein a signal to noise ratio (SNR) of said second transceiver in response to near end cross talk (NEXT) noise, and a SNR of said second transceiver in response to far end crosstalk (FEXT) noise, is used to determine a composite SNR, and wherein said maximum bit rate is determined from said composite SNR.

2. The system of claim 1, wherein said transmitting and receiving of said information is performed simultaneously.

3. The system of claim 1, wherein said system is an asymmetric digital subscriber line system.

4. The system of claim 1, wherein said network topology is further defined by FEXT noise being larger than NEXT noise.

5. The system of claim 1, wherein determining said maximum bit rate from said composite SNR is further defined by said transfer of said information being minimally affected by said FEXT noise and said NEXT noise.

6. A method of providing a maximum bit rate for the transfer of information regardless of network topology, comprising the steps of:

determining a first signal to noise ratio (SNR) for data transmission when a first transceiver experiences near end crosstalk (NEXT) noise;

determining a second SNR for data transmission when a first transceiver experiences far end crosstalk (FEXT) noise;

deriving a composite SNR comprising minimum values of said SNR for data transmission when said first transceiver experiences NEXT and when said first transceiver experiences FEXT; and determining said maximum bit rate from said composite SNR such that transmitting said information at said determined maximum bit rate is minimally affected by NEXT noise and FEXT noise.

7. The method of claim 6, wherein said step of determining a signal to noise ratio for data transmission when said first transceiver experiences near end crosstalk noise is performed in accordance with the ITU G.992 standard.

8. The method of claim 6, wherein said step of determining a signal to noise ratio for data transmission when said first transceiver experiences far end crosstalk noise is performed in accordance with the ITU G.992 standard.

9. The method of claim 6, wherein said information is simultaneously transferred between an asymmetric digital subscriber line central office and an asymmetric digital subscriber line customer premise.

10. The method of claim 6, wherein said network topology is further defined by said far end crosstalk noise being higher than said near end crosstalk noise.

11. The method of claim 6, wherein said first transceiver transmits to and receives from a second transceiver.

12. The method of claim 11, wherein said transmission between said first transceiver and said second transceiver is performed simultaneously.

13. The method of claim 6, wherein said data is transmitted in symbols.

14. The method of claim 6, wherein said method is performed in response to an asymmetric digital subscriber line (ADSL) system selecting said method at start-up of said ADSL system.

15. A method of providing a maximum bit rate in an asymmetric digital subscriber line (ADSL) system for the transfer of information regardless of network topology, comprising the steps of:

selecting a bitmap profile configuration, selected from a group comprising single, dual and trial bitmap profile configurations, wherein said trial bitmap profile configuration is further defined by the steps of:

determining a signal to noise ratio (SNR) for data transmission when a first transceiver experiences near end crosstalk (NEXT) noise;

determining a SNR for data transmission when said first transceiver experiences far end crosstalk (FEXT) noise;

deriving a composite SNR comprising minimum values of said SNR for data transmission when said first transceiver experiences NEXT noise and when said first transceiver experiences FEXT noise; and determining said maximum bit rate from said composite SNR such that transmitting said information at said determined maximum bit rate will be minimally affected by NEXT noise and FEXT noise.

16. The method of claim 15, wherein said selection is performed at the start-up of said ADSL system.

17. The method of claim 15, wherein said selection is initiated by a user of said ADSL system.

18. The method of claim 15, wherein said information is simultaneously transferred between an ADSL central office and an ADSL customer premise.

19. A system for providing a maximum bit rate for the transfer of information, by limiting crosstalk, regardless of network topology, comprising:

a means for transmitting information; and a means for receiving said information from said means for transmitting information, wherein a signal to noise ratio (SNR) of said means for receiving in response to near end cross talk (NEXT) noise, and a SNR of said means for receiving in response to far end crosstalk (FEXT) noise, is used to determine a composite SNR, and wherein said maximum bit rate is determined from said composite SNR.

20. The system of claim 19, wherein said network topology is further defined by said FEXT noise being larger than said NEXT noise.

21. A transceiver for providing a maximum bit rate for the transfer of information, by limiting crosstalk, independent of, said transceiver for receiving information from an alternate transceiver, wherein a first signal to noise ratio (SNR) of said transceiver in response to near end cross talk (NEXT) noise, and a second SNR of said transceiver in response to far end crosstalk (FEXT) noise, is used to determine a composite SNR, and wherein said maximum bit rate is determined from said composite SNR.

* * * * *